US010030151B2

(12) United States Patent
Gantillon et al.

(10) Patent No.: US 10,030,151 B2
(45) Date of Patent: Jul. 24, 2018

(54) PRIMER COMPOSITIONS FOR NON-STICK COATINGS AND METHOD FOR MANUFACTURING SAME

(71) Applicant: SEB S.A., Ecully (FR)

(72) Inventors: Barbara Gantillon, Leschaux (FR); Jean-Luc Perillon, Saint Paul Trois Chateaux (FR); Aurelien Dubanchet, Gresy sur Aix (FR)

(73) Assignee: SEB S.A., Ecully (FR)

( * ) Notice: Subject to any disclaimer, the term of this patent is extended or adjusted under 35 U.S.C. 154(b) by 784 days.

(21) Appl. No.: 14/394,173

(22) PCT Filed: Apr. 11, 2013

(86) PCT No.: PCT/FR2013/050793
§ 371 (c)(1),
(2) Date: Oct. 13, 2014

(87) PCT Pub. No.: WO2013/153337
PCT Pub. Date: Oct. 17, 2013

(65) Prior Publication Data
US 2015/0072091 A1    Mar. 12, 2015

(30) Foreign Application Priority Data

Apr. 11, 2012   (FR) ...................................... 12 53325

(51) Int. Cl.
| C09D 5/00 | (2006.01) |
| C09D 179/08 | (2006.01) |
| C08G 73/14 | (2006.01) |
| C09D 127/16 | (2006.01) |
| C09D 127/18 | (2006.01) |
| B05D 3/02 | (2006.01) |
| C23C 28/04 | (2006.01) |
| B05D 7/14 | (2006.01) |
| B05D 7/00 | (2006.01) |

(52) U.S. Cl.
CPC ........... *C09D 5/002* (2013.01); *B05D 3/0272* (2013.01); *C08G 73/14* (2013.01); *C09D 127/16* (2013.01); *C09D 127/18* (2013.01); *C09D 179/08* (2013.01); *C23C 28/048* (2013.01); *B05D 7/14* (2013.01); *B05D 7/542* (2013.01); *Y10T 428/1359* (2015.01); *Y10T 428/31678* (2015.04)

(58) Field of Classification Search
CPC .............................. C09D 179/08; C08L 27/12
USPC ........................................................ 428/35.9
See application file for complete search history.

(56) References Cited

U.S. PATENT DOCUMENTS

| 5,880,205 | A | 3/1999 | Tannenbaum |
| 6,479,581 | B1 | 11/2002 | Ireland et al. |
| 6,592,977 | B2 | 7/2003 | Thomas et al. |
| 2005/0103224 | A1* | 5/2005 | Patel ...................... C08G 73/14 106/2 |
| 2007/0298212 | A1* | 12/2007 | Wang ....................... B05D 7/16 428/116 |
| 2008/0118741 | A1 | 5/2008 | Michalczyk et al. |
| 2014/0150247 | A1* | 6/2014 | Flores Ramirez ....... C09D 5/08 29/592 |

FOREIGN PATENT DOCUMENTS

| GB | 1512495 A | 6/1978 |
| JP | 2000238205 A | 9/2000 |
| JP | 2002538278 A | 11/2002 |
| JP | 2010111844 A | 5/2010 |
| JP | 2011184694 A | 9/2011 |
| WO | WO 2005012423 A1 * | 2/2005 ............. C08L 27/12 |

OTHER PUBLICATIONS

Application Bulletin Torlon Al-10 Polymer. Hankel Coroporation. Available at https://wenku.baidu.com/view/3f8a8a0f52ea551810a68793.html. Evidentiary Reference. Mar. 19, 2011.*
Machine Translation of JP 2010111844.*

* cited by examiner

*Primary Examiner* — Michael M Dollinger
(74) *Attorney, Agent, or Firm* — The Webb Law Firm

(57) ABSTRACT

Provided is a primer composition for a non-stick coating which includes a polyamide-amic acid having an acid value of 50 to 200 mg KOH/g, a Lewis base, water and at least 5 wt % of a polar aprotic solvent relative to the total weight of said composition. According to the invention, the weight ratio of PAI/polar aprotic solvent in said composition is at least 1.5. Also provided is a method for preparing such a composition, and a method for manufacturing an item comprising a metal substrate to which such a composition is applied.

24 Claims, No Drawings

PRIMER COMPOSITIONS FOR NON-STICK COATINGS AND METHOD FOR MANUFACTURING SAME

CROSS-REFERENCE TO RELATED APPLICATIONS

This application is the United States national phase of International Application No. PCT/FR2013/050793 filed Apr. 11, 2013, and claims priority to French Patent Application No. 1253325 filed Apr. 11, 2012, the disclosures of which are hereby incorporated in their entirety by reference.

FIELD OF THE INVENTION

The present invention relates in a general manner to fluorocarbon resin-based primer compositions for non-stick coatings. The present invention also relates to a method for preparing such a compositions as well as to a method for manufacturing an item comprising a metal substrate on which such a composition is applied.

BACKGROUND OF THE INVENTION

Primer compositions for non-stick coatings generally contain a solvent-borne polyamide-imide (PAI) as a bonding resin. Heavy polar aprotic solvents are standardly used as solvents in PAI-based compositions.

In the sense of the present application, polar aprotic solvents are understood to mean solvents which possess a non-zero dipole moment and which are bereft of hydrogen which may form a hydrogen bond. As examples of such polar aprotic solvents, mention can be made especially of NEP (N-ethylpyrrolidone), N-methyl-2-pyrrolidone (NMP), dimethylformamide (DMF), N,N-dimethylacetamide (DMAC), dimethyl sulfoxide (DMSO), etc.

As a bonding resin in primer compositions for non-stick coatings for cookware items, in particular use is frequently made of a solvent-borne polyamide-imide (PAI) resin with 30% dry extract in N-ethylpyrrolidone (NEP) or in N-methylpyrrolidone (NMP), which are solvents generating VOCs and considered as potentially toxic and hazardous.

SUMMARY OF THE INVENTION

The main object of the present invention is to manufacture fluorocarbon resin- and PAI-based primer compositions for non-stick coatings containing very little or even no heavy polar aprotic solvent, and preferably free of organic solvent.

To solve this technical problem, the applicant developed a method for preparing an aqueous primer composition in which a polyamide-amic acid and Lewis base mixture is emulsified in an aqueous medium. This makes it possible to greatly restrict, or even eliminate, the use of any polar aprotic solvent and/or of organic solvent for solubilizing the PAI bonding resin while still allowing high contents of PAI resins to be kept in the formulations.

An aqueous primer composition is thus obtained in which the PAI bonding resin is essentially emulsified in water.

DETAILED DESCRIPTION OF THE INVENTION

More particularly, the object of the present invention is thus a primer composition for a non-stick coating, comprising a fluorocarbon resin, a polyamide-amic acid having an acid value comprised between 50 and 200 mg of KOH/g, a Lewis base, water, and less than 5 wt % of a polar aprotic solvent relative to the total weight of said composition, characterized in that the weight ratio between the quantity of polyamide-amic acid in said composition and the quantity of polar aprotic solvent (or PAI/polar aprotic solvent weight ratio) in said composition is at least 1.5, preferably comprised between 5 and 9, and more preferably around 7.

A PAI/polar aprotic solvent weight ratio greater than 1.5 makes it possible to ensure good safety when applying because the primer and the intermediates remain exempt from the labeling requirement.

In the sense of the present patent application, labeling is understood to mean the conditions under which solvents and solvent mixtures are subject to the labeling requirement. These conditions are defined by the following texts: REGULATION (EC) No. 1272/2008 OF THE EUROPEAN PARLIAMENT AND OF THE COUNCIL of 16 Dec. 2008 and its amendments for the purpose of its adaptation to technical progress, such as DIRECTIVE 2009/2/EC of the European Commission of 15 Jan. 2009.

For human health reasons, it is preferable to keep for example certain solvents toxic to reproduction below certain limits (around 5% polar aprotic solvent in the composition in the present case). When these limits are respected, the regulation and its amendments allow the solvent in question to be considered as not posing any real human health problems and the mixture is therefore not subject to classification under the regulation, thus permitting a use with less stringent safety requirements and absence of labeling for the mixture. An absence of labeling or an exemption from labeling would thus be construed as signifying that the content is sufficiently low such that the very restrictive classification of the solvent in question would not be extended to the entire mixture.

The primer composition according to the invention does not require labeling.

A high PAI/polar aprotic solvent weight ratio (near 7) makes it possible to ensure maximum safety in the application.

Under industrial conditions in which it is necessary promote drying by facilitating water evaporation, use would rather be made of primers with a PAI/polar aprotic solvent weight ratio slightly greater than 1.5.

Although values greater than 9 are possible and even desirable because they provide maximum safety, given the current state of technology they are not cost-effective because they require an expensive purification (i.e., elimination of the synthesis solvent) of the resin.

A PAI/polar aprotic solvent weight ratio of at least 1.5 can also be obtained by increasing the non-polar aprotic solvent fraction, but this is done at the expense of a slight loss of dry extract and a relative increase in the content of volatile organic compounds.

In all cases the primer compositions according to the invention, which do not have to be labeled, have high dry extracts, thus making it possible to reduce the number of layers for a given thickness.

Advantageously, the primer composition according to the invention comprises less than 1 wt %, and preferably less than 0.3 wt %, of polar aprotic solvent relative to the total weight of said composition.

Such a primer composition exhibits much better stability over time, with viscosity properties that do not change over time, whether at ambient temperature or even at 40° C. Furthermore, such compositions are non-odorous (compared to solvent-based primer compositions) and are characterized by low VOC (volatile organic compounds) levels of around 1 wt % to 12 wt % and preferably very low levels of 1 wt % to 5 wt % versus more than 15% for solvent-borne formulations.

After application on a substrate, especially metallic, and then baking at a temperature of around 420° C., a primer layer exhibiting excellent adhesion to the substrate is obtained.

Finally, a non-stick coating comprising a primer composition according to the invention, which is standardly covered by one or more fluorocarbon resin-based finish layers, exhibits corrosion resistance and abrasion resistance properties equivalent to those of a non-stick coating in which the primer layer or layers was/were obtained from PAI dissolved in a polar aprotic solvent alone or in a mixture containing at least 33% of such a solvent.

As polar aprotic solvents usable (in low concentration) in the scope of the present invention, mention can be made especially of the solvents chosen from the group comprising NEP (N-ethylpyrrolidone), N-methyl-2-pyrrolidone (NMP), dimethylformamide (DMF), N,N-dimethylacetamide (DMAC), dimethyl sulfoxide (DMSO), etc.

Advantageously, the primer composition according to the invention can further comprise less than 45 wt %, preferably less than 20 wt %, and more preferably less than 10 wt %, of a non-polar aprotic organic solvent relative to the total weight of the composition.

As non-polar aprotic organic solvents usable in the scope of the present invention, mention can be made especially of propylene glycol, propylene glycol acetate, alcohols, aromatics such as xylene, etc.

As Lewis bases usable in a primer composition according to the invention, mention can be made especially of secondary aliphatic amines, hydroxylated or not, hydroxylated primary amines, imidazoles, imidazolines, and secondary heterocyclic amines.

In the scope of the present invention, preference is given to using 2-butyl-aminoethanol, isopropylaminoethanol, and amino-2-ethyl-1,3-propanediol as Lewis bases.

Advantageously, the polyamide-amic acid can comprise amide-amic acid units of the structural formula [1] in which R represents a divalent arylene radical:

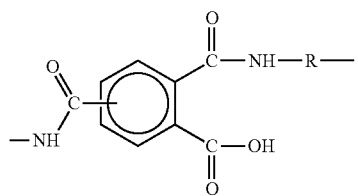

[1]

and amide-imide units of the structural formula [2]:

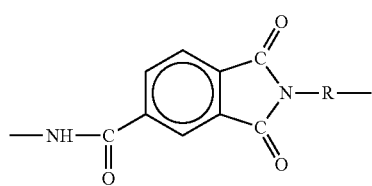

[2]

the molar ratio of said amide-amic acid units to said amide-imide units being comprised between 18:1 and 5:1.

The fluorocarbon resin of the primer composition according to the invention can advantageously be chosen from the group comprising polytetrafluoroethylenes (PTFE), tetrafluoroethylene-perfluoropropylvinylether copolymers (PFA), tetrafluoroethylene-hexafluoropropene copolymers (FEP), polyvinylidene fluorides (PVDF), MVA (TFE/PMVE copolymer), TFE/PMVE/FAVE terpolymers, ETFE, and mixtures thereof.

As a fluorocarbon resin, preference is given to using polytetrafluoroethylene (PTFE), or a mixture (PTFE/PFA) of polytetrafluoroethylene (PTFE) and tetrafluoroethylene-perfluoropropylvinylether copolymer (PFA), or a mixture (PTFE/FEP) of polytetrafluoroethylene (PTFE) and tetrafluoroethylene-hexafluoropropene copolymer (FEP).

Advantageously, the fluorocarbon resin can represent 20 wt % to 98 wt %, and preferably 50 wt % to 80 wt %, of the total dry weight of the primer composition.

Advantageously, the primer composition according to the invention can further comprise at least one filler, which can represent less than 40 wt %, and preferably 5 wt % to 20 wt %, of the total dry weight of the primer composition.

In the scope of the present invention, preference is given to using silica or alumina nanoparticles as fillers.

A further object of the present invention is a method for preparing a primer composition, which comprises the following steps:
preparation of an aqueous mixture containing:
a polyamide-amic acid having an acid value comprised between 50 and 200 mg of KOH/g;
a Lewis base, present in said aqueous mixture in a quantity representing 95% to 250% of the stoichiometric quantity needed to neutralize the acid groups of said polyamide-amic acid,
water, and
less than 5 wt % of polar aprotic solvent relative to the total weight of said composition;
emulsification of said aqueous mixture by heating at atmospheric pressure and at a temperature of at least 40° C., and preferably at a temperature comprised between 50 and 85° C.;
then mixing of said emulsion with the fluorocarbon resin in powder form or in aqueous dispersion;
the method being characterized in that the polyamide-amic acid is present in a quantity such that the weight ratio of the quantity of polyamide-amic acid in said composition to the quantity of polar aprotic solvent in said composition is at least 1.5, preferably 5 to 9, and more preferably around 7.

Preference is given to the primer composition comprising less than 1 wt %, and preferably less than 0.3 wt %, of polar aprotic solvent relative to the total weight of the composition.

A very low content of polar aprotic solvent in the composition makes it possible not only to limit the release of volatile organic compounds (VOC) quite considerably but also to obtain a particularly healthy and safe formulation. Indeed, at contents less than 5%, or even less than 0.3%, the formulation is no longer considered toxic to reproduction or even irritating. The handling of the formulation is thus facilitated because the precautions that must be taken are simplified.

The Lewis base, the polyamide-amic acid, and the polar aprotic solvent are as defined previously.

The non-polar aprotic organic solvent is likewise as defined above. Even though it contributes to the emission of volatile organic compounds, it may turn out to be needed in the composition for regulating the evaporation of the volatile substances and for facilitating the formation of a tight film.

Advantageously, the primer composition according to the invention can comprise less than 45 wt %, preferably less than 20 wt %, and more preferably less than 10 wt %, of a non-polar aprotic organic solvent relative to the total weight of the composition.

The primer composition prepared according to the method of the invention is an emulsion in which the dispersing medium is water and the dispersed phase is advantageously in the form of droplets with a mean diameter equal or less than 5 µm, preferably comprised between 20 and 500 nm, and more preferably comprised between 20 and 300 nm.

A further object of the present invention is a method for manufacturing an item, comprising the following steps:

provision of a metal substrate having two opposite sides;

application of at least one layer of primer composition as defined in claim previously on one of the sides of said substrate;

application of at least one layer of finish composition comprising at least one fluorocarbon resin on said layer of primer composition; then baking of the whole at a temperature comprised between 370° C. and 430° C.

Finally, still another object of the present invention is an item obtainable by the method of manufacturing an item according to the invention.

Different types of items according to the invention, having different shapes and made of different materials, are conceivable.

Hence such an item can be one having a support made of a material chosen from the metals, glass, ceramics, and plastics.

Advantageously, mention can be made of aluminum or aluminum alloy, anodized or not, or polished, brushed, bead-blasted, sand-blasted, or chemically treated aluminum, or polished, brushed, or bead-blasted stainless steel or cast iron or aluminum, titanium, or hammered or polished copper supports as metal supports usable in the method of the invention.

The item according to the invention can be, especially, a cookware item, and in particular can comprise a support, one of the sides of which constitutes an inner side intended to contact food placed inside said item and the other side of which is a convex outer side intended to contact a heat source.

As non-limiting examples of cookware items according to the present invention, mention can be made especially of cookware items such as casseroles and sauté pans, woks and sauteuse pans, Dutch ovens and skillets, pressure cookers, crepe makers, grills, baking tins and sheets, raclette cups, barbecue grills and sheets, prep bowls, vats for deep fryers and rice cookers.

Other kinds of supports that are not limited to just the culinary field are also conceivable. Hence electric household appliances such as clothes irons, hair curling and straightening irons, etc., and insulated carafes (for coffee makers, for example) or mixing bowls are conceivable as items according to the invention.

The invention is illustrated in more detail in the following examples.

Unless indicated otherwise, all of the percentages and fractions in these examples are expressed as weight percents.

EXAMPLES

Products
Supports
  aluminum supports with diameter sandblasted on their two main sides (having a measured arithmetic mean surface roughness Ra comprised between 4 and 6 µm);
  smooth, simply degreased aluminum supports.
Aqueous Intermediate Mixtures
  Amines:
    2 butyl-aminoethanol, sold by the company TAMINCO under the brand name Advantex®
    Characteristics:
    CAS no.: 111-75-1;
    Molecular weight Mw: 117.2 g/mol;
    B.P.=199° C. (boiling point);
    flash point=96° C., pKa=10, density: 0.891;
    very slight odor.
    Isopropylaminoethanol (IPAE), sold by the company ARKEMA under the brand name Alpamine® N41
    Characteristics:
    CAS no. of the amine: 35265-04-4;
    B.P.=186° C. (boiling point);
    flash point=85° C., pKa=9.9.
    Amino-2-ethyl-1,3-propanediol (AEPD), sold by the company Angus-DOW CHEMICAL under the brand name AEPD™ VOX1000
    Characteristics:
    CAS no. of the amine: 115-70-8;
    Molecular weight Mw: 119 g/mol;
    B.P.=259° C. (boiling point);
    flash point=119° C., pKa=8.8.
    Triethylamine
    CAS no.: 121-44-8;
    B.P.=89° C.; pKa=10.8;
    very strong amine odor.
  Powdered polyamide-amic acid with 35% dry extract and less than 5 wt % of NMP;
  Polyamide-imide resin (PAI) with 29% dry extract in NEP (n-ethylpyrrolidone).
Aqueous Primer Compositions
  Filler: non-surface-modified colloidal silica with a specific surface of ca. 220 m$^2$/g and in the form of an aqueous dispersion with 30% dry extract;
  Carbon black dispersion with 25% dry extract;
  PTFE dispersion with 60% dry extract;
  Ethoxylated alkylphenol-based non-ionic surfactant system with 13% dry extract;
  Propylene glycol (organic solvent).
Tests
Determination of the Dry Extract in an Aqueous Intermediate Mixture
Principle The dry extract of a product is the solid residue portion remaining after the evaporation of the volatile substances that it contains. Because solvents with high boiling points, monomer fractions, reactive diluents, and reaction byproducts (depending on their retention rate) leave the film being formed very slowly, the drying temperature and duration play a key role. It is thus very important to define drying conditions standardized as close as possible to actual practice in a very conventional manner.
Procedure
  This dry extract is measured as follows:
    an aluminum cup is weighed: $m_0$=weight of the cup;
    0.5 to 3 g of the product to be analyzed are disposed;
    the filled cup is weighed: $m_1$=weight of the filled cup;

$m_1-m_0$=weight of the sample before drying;
the cup is put in an oven set at 210° C. for two hours;
after drying and after cooling, the cup is weighed: weight $m_2$;
$m_2-m_0$=weight of the sample after drying;
the dry extract is given by the formula (1) below:

$$\text{Dry extract}=100\times(m_2-m_0)/(m_1-m_0) \qquad (1)$$

Evaluation of the Viscosity Stability of an Aqueous Intermediate Mixture or of an Aqueous Phase Primer Composition The viscosity stability of a composition consisting of an aqueous intermediate (without PTFE) or primer (with PTFE and fillers) mixture applied by spraying is evaluated by measuring the flow times according to the DIN EN ISO 2433/ASTM D5125 standard by means of a 2.5 cup or a 4 cup:
  the viscosity corresponds to the continuous flow time expressed in seconds of the volume of the cup through the calibrated orifice. The choice of the cup is made on the basis of the presumed viscosity of the product;
  monitoring the evolution of the viscosity by measuring the continuous flow time of the standardized volume at ambient temperature immediately after the preparation of the compositions, and monitoring the evolution of this viscosity over time at ambient temperature;
  putting the compositions, once formulated, in an oven at 40° C.; then monitoring the evolution of the flow time and hence of the viscosity (evaluation of the stability of the emulsion after ageing at 40° C.) over time.

Measurement of Particle Size and Particle Size Distribution by Light Diffraction The size of the particles contained in the aqueous intermediate mixture without PTFE is determined by light diffraction using a Beckman Coulter LS230 laser granulometer equipped with a variable speed fluid module. The principle of the measurement is as follows:
  the sample is diluted in a large volume of water;
  6 measurements are carried out in order to obtain a mean particle size value;
  the granulometer measures a volumetric and numerical particle size distribution; the numerical mean is retained.

Evaluation of the Resistance of a Non-Stick Coating to Abrasion

The resistance of a non-stick coating to abrasion is evaluated on a sandblasted aluminum substrate. This is done as follows:
  a bonding primer composition (as defined in examples 6-13) is applied on the substrate to form a moist layer of bonding primer, then
  a finish composition F, the composition of which is given below per 100 g of composition (identical for each test performed with each of the primer compositions of examples 6-13), is applied to this primer layer:

| Finish composition F | |
| --- | --- |
| PTFE dispersion (60% extract dry): | 80.6 g |
| PFA dispersion (50% extract dry): | 0.5 g |
| Lamp black (25% extract dry) | 0.02 g |
| Spreaders (surfactants): | 2.23 g |
| Water: | 8.02 g |
| Xylene: | 6.50 g |
| Acrylic copolymer >95%: | 0.6 g |

| -continued | |
| --- | --- |
| Finish composition F | |
| Triethanolamine: | 0.22 g |
| Metallized glitter: | 0.2 g |
| Propylene Glycol: | 1.11 g |
| Total: | 100.00 g |

This test performed according to the AFNOR NF D21-511 §3.3.7 standard consists of:
  evaluating the resistance of the non-stick coating (comprising a primer layer and a finish layer) to scratching by subjecting it to the action of a SCOTCH BRITE® green abrasive pad on the one hand, the resistance to scratching being estimated quantitatively by the number of passes of the pad required to make the first scratch (corresponding to the appearance of the constituent metal of the support); and
  evaluating the loss of non-sticking of the coating throughout the test on the other, this being estimated quantitatively by the number of cycles completed until loss of non-sticking of the coating (carbonized milk test—according to the NF D 21-511 standard): the latter is measured relative to ease or difficulty in cleaning of the carbonized milk. The ranking is as follows:
    100: indicates that the film of carbonized milk is completely removed by simple application of a jet of water from a kitchen faucet;
    50: indicates that it is necessary to add circular motions of the object under the water jet in order to remove the carbonized film completely;
    25: indicates that 10 minutes of soaking and possibly wiping with a wet sponge are necessary in order to remove the film completely;
    0: indicates that after the previous process, all or part of the carbonized film remains stuck.

Evaluation of the Adhesion of a Primer Layer on a Smooth Aluminum Substrate

A cross hatch test according to the ISO 2409 standard is performed, followed by immersion of the item for 18 hours (consisting of 3 cycles of 3 hours in boiling water alternating with 3 cycles of 3 hours in oil at 200° C.). The non-stick coating is then inspected to determine whether or not it has separated.

The ranking is as follows:
  no square may be separated in order to obtain a ranking of 100 (excellent adhesion);
  in the event of separation, the value recorded is equal to 100 minus the number of separated squares.

Evaluation of the Resistance of a Non-Stick Coating on a Smooth Aluminum Substrate to Corrosion The resistance of a non-stick coating on a smooth aluminum substrate to corrosion is evaluated by evaluating its resistance to the diffusion of salt to the metal substrate which corrodes.

This is done as follows:
  a bonding primer composition (as defined in examples 6 to 13) is applied on the substrate to form a moist layer of bonding primer; then
  the finish composition F (identical for each test conducted with each of the primer compositions of examples 6 to 13) is applied on this primer layer;
  the substrate thus coated is immersed for 20 hours in an aqueous saline solution brought to a boil. This saline solution comprises 10 wt % of sodium chloride. The protocol for this test is defined in the AFNOR NF D21-511 §3.3.5. standard;

after each immersion, the final appearance of the coating is visually inspected, wherein the presence or absence of traces of corrosion is noted (by visual observation with the naked eye or with a binocular scope). In practice this involves detecting the possible presence of any marks such as blisters with extension of zones, white marks under the coating;

following this observation, a cross hatch test is performed according to the ISO 2409 standard.

Example 1

Preparation of a 2-Butyl-Aminoethanol-Based Aqueous Intermediate Mixture SF1 (with Less than 1 wt % of Polar Aprotic Solvent)

An aqueous intermediate mixture SF1, comprising the following compounds, in the respective quantities indicated in g, is prepared:

| | |
|---|---|
| 2-butylaminoethanol | 26 g |
| polyamide-amic acid (with 35% dry extract and less than 5% NMP) | 149 g |
| distilled water | 580 g, |
| TOTAL | 755 g |

In the mixture SF1, the water/amine weight ratio is ca. 94/6 such that there is a large excess of amine relative to the terminal carboxyl groups of the acid polyamide-amic. The weight percent of amine in the mixture is 5%. The content of polar aprotic solvent in the mixture SF1 is less than 1 wt % relative to the total weight of the mixture.

The aqueous intermediate mixture SF1 is prepared as follows:
water and amine are introduced in a reactor;
the mixture obtained is stirred, and then heated to a temperature of 65° C.+/−5° C.;
the polyamide-amic acid powder is then added, while stirring, to the mixture;
the mixture thus obtained is maintained at 65° C., while stirring, for at least 2 hr 30 min and until at most 5 hr.

The aqueous mixture SF1 thus obtained has the following properties:
theoretical dry extract: 6.9%,
dry extract measured in the solution: 8%,
the mixture is an opalescent white, very fluid emulsion,
viscosity (in a 2.5 cup according to the DIN EN ISO 2433/ASTM D5125 standard): 50 sec,
after ageing at 40° C., the emulsion SF1 is still stable after 60 days of storage, less than 20% change in viscosity.

The determination of particle size by light diffraction using a laser granulometer showed that a main peak centered on a mean diameter of 135 nm was obtained and that there were not any coarse particles larger than 4 μm. The absence of particles larger than 4 μm confirms that all of the powder was emulsified.

Example 2

Preparation of an Isopropylaminoethanol-Based Aqueous Intermediate Mixture SF2 (with Less than 1 wt % of Polar Aprotic Solvent)

An aqueous intermediate mixture SF2, comprising the following compounds, in the respective quantities indicated in g, is prepared:

| | |
|---|---|
| isopropylaminoethanol (IPAE) | 26 g |
| polyamide-amic acid (with 35% dry extract and less than 5% NMP) | 149 g |
| distilled water | 355 g, |
| TOTAL | 530 g |

In the mixture SF2, the water/amine weight ratio is ca. 94/6 such that there is a large excess of amine relative to the terminal carboxyl groups of the acid polyamide-amic. The weight percent of amine in the mixture is 5%. The polyamide-amic acid/amine weight ratio is 67/33. The content of polar aprotic solvent in the mixture SF2 is less than 1 wt % relative to the total weight of the mixture.

The aqueous intermediate mixture SF2 is made in the same manner as in example 1.

The aqueous mixture SF2 thus obtained has the following properties:
theoretical dry extract: 9.8%,
dry extract measured in the solution: 11%,
the mixture is an opalescent white, very fluid emulsion,
viscosity (in a 2.5 cup according to the DIN EN ISO 2433/ASTM D5125 standard): 70 sec,
after ageing at 40° C., the emulsion SF2 is stable after 50 days of storage, less than 20% change in viscosity.

Example 3

Preparation of an Amino-2-Ethyl-1,3-Propanediol-Based Aqueous Intermediate Mixture SF3 (with Less than 1 wt % of Polar Aprotic Solvent)

An aqueous intermediate mixture SF3, comprising the following compounds, in the respective quantities indicated in g, is prepared:

| | |
|---|---|
| polyamide-amic acid (with 35% dry extract and less than 5% NMP) | 149 g |
| amino-2-ethyl-1,3-propanediol | 26 g |
| distilled water | 265 g, |
| TOTAL | 440 g |

In the mixture SF3, the water/amine weight ratio is ca. 94/6 such that there is a large excess of amine relative to the terminal carboxyl groups of the acid polyamide-amic. The weight percent of amine in the mixture is 5%. The polyamide-amic acid/amine weight ratio is 68/32. The content of polar aprotic solvent in the mixture SF3 is less than 1 wt % relative to the total weight of the mixture.

The aqueous intermediate mixture SF3 is made in the same manner as in example 1.

The aqueous mixture SF3 thus obtained has the following properties:
theoretical dry extract: 12%,
dry extract measured in the solution: 13%,
the mixture is an opalescent white, very fluid emulsion,
viscosity (in a 2.5 cup according to the DIN EN ISO 2433/ASTM D5125 standard): 250 sec,
after ageing at 40° C., the emulsion SF3 is still stable after 60 days of storage, less than 20% change in viscosity.

Comparative Example 4

Preparation of a Polyamide-Imide Resin-Based PAI Aqueous Intermediate Mixture SFC4 with Ca. 71 wt % of Polar Aprotic Solvent An aqueous mixture of intermediate SFC4, comprising the following compounds, in the respective quantities indicated in g per 1000 g of composition, is prepared:

| | |
|---|---|
| PAI resin with 29% dry extract in NEP | 327.9 g |
| N-ethylpyrrolidone polar aprotic solvent | 117.7 g |
| triethylamine: | 32.8 g |
| distilled water | 521.6 g |
| TOTAL | 1000 g |

Dissolving the PAI comprises a step of milling the PAI, the milling of the above-mentioned compounds being carried out in a Discontimill® ball mill at ambient temperature for a period ranging from 2 to 5 hours.

In the mixture SFC4, the water/amine weight ratio is ca. 94/6. The weight percent of amine in the mixture is 3.3%. The polyamide amic acid/amine weight ratio is 74/26. The content of polar aprotic solvent in the mixture SFC4 is 35 wt % relative to the total weight of the mixture.

The aqueous mixture SFC4 thus obtained has the following properties:
- theoretical dry extract: 9.5%,
- dry extract measured in the solution: 9.3%,
- the mixture is a very viscous, translucent yellow solution,
- viscosity (in a 4 cup according to the DIN EN ISO 2433/ASTM D5125 standard): 130 sec,
- after ageing at 40° C., the emulsion SFC4 is no longer stable after 10 days of storage: it has separated and the bottom portion has thickened considerably.

Example 5

Preparation of a Triethylamine-Based Aqueous Intermediate Mixture SF5 (with Less than 5 wt % of Polar Aprotic Solvent)

An aqueous intermediate mixture SF5 comprising the following compounds, in the respective quantities indicated in g for, is prepared:

| | |
|---|---|
| polyamide amic acid (with 35% dry extract and less than 5% NMP) | 103 g |
| triethylamine | 21.4 g |
| distilled water | 485 g |
| TOTAL | 609.4 g |

The aqueous intermediate mixture SF5 is prepared as follows:
- a mixture of water and triethylamine is introduced in a reactor;
- the mixture obtained is stirred, then heated to a temperature of 65° C.+/−5° C.;
- the powdered polyamide amic acid is then added, while stirring, to the mixture;
- The mixture thus obtained is maintained at 65° C., while stirring, for at least 5 hours and until at most 10 hours.

The aqueous mixture SF5 thus obtained has the following properties:
- theoretical dry extract: 6%,
- dry extract measured in the solution: 6.3%,
- the mixture is a viscous, honey-colored translucent product,
- viscosity (in a 4 cup according to the DIN EN ISO 2433/ASTM D5125 standard): 50 sec,
- after ageing at 40° C., the product forms a gel after just 10 days of storage (no flowing, viscosity not measurable.)

Example 6

Preparation of an Aqueous Phase Primer Composition P1 from the Intermediate SF1 of Example 1

A bonding primer composition P1 comprising the following compounds, in the respective quantities indicated in g per 100 g of composition, is prepared:

| | |
|---|---|
| PTFE dispersion (60% dry extract) | 34.36 g |
| carbon black dispersion (25% dry extract) | 3.95 g |
| intermediate SF1 (6.9 % dry extract) | 41.89 g |
| ethoxylated alkylphenol-based non-ionic surfactant system (13%) | 5.81 g |
| colloidal silica (30% dry extract) | 12.37 g |
| distilled water | 1.62 g |
| TOTAL | 100 g |

The content of amine in the primer is less than 2%. The content of polar aprotic solvent in the primer composition is less than 0.3%. The content of organic solvent is less than 5%. The content of water in the primer formulation is comprised between 65% and 68%.

The content of PAI resin in the total composition is 2.89%.

The content of polar aprotic solvent (NMP) in the total composition is 0.41%.

The weight ratio between the quantity of polyamide-amic acid in the primer composition P1 and the quantity of polar aprotic solvent (NMP) in the primer composition P1 (PAI/PAS ratio, PAS denoting a polar aprotic solvent) is 7.05.

To prepare the primer composition P1, all of the other compounds mentioned above are added to the aqueous intermediate SF1.

The primer composition P1 thus obtained has the following properties:
- measured dry extract of the primer: 29.5%,
- viscosity (in a 2.5 cup according to the DIN EN ISO 2433/ASTM D5125 standard): 50 sec,
- the content of volatile organic compounds is 1.86%.

Example 7

Preparation of an Aqueous Phase Primer Composition P2 from the Intermediate SF2 of Example 2

A bonding primer composition P2 comprising the following compounds, in the respective quantities indicated in g per 100 g of composition, is prepared:

| | |
|---|---|
| PTFE dispersion (60% dry extract) | 31.52 g |
| carbon black dispersion (25% dry extract) | 3.62 g |

-continued

| | |
|---|---|
| intermediate SF2 (9.8% dry extract) | 38.43 g |
| ethoxylated alkylphenol-based non-ionic surfactant system (13%) | 5.33 g |
| colloidal silica (30% dry extract) | 11.35 g |
| propylene glycol | 8.26 g |
| distilled water | 1.49 g |
| TOTAL | 100 g |

The content of amine in the primer is less than 2%. The content of polar aprotic solvent in the composition is less than 0.3%. The content of organic solvent is comprised between 8% and 10%. The content of water in the primer formulation is comprised between 60% and 63%.

The content of PAI resin in the total composition is 3.78%.

The content of polar aprotic solvent (NMP) in the total composition is 0.54%.

The weight ratio between the quantity of polyamide-amic acid in the primer composition P2 and the quantity of polar aprotic solvent (NMP) in the primer composition P2 (PAI/PAS ratio) is 7.

To prepare the primer composition P2, all of the other compounds mentioned above are added to the aqueous intermediate SF2.

The primer composition P2 thus obtained has the following properties:
  measured dry extract of the primer: 26.5%,
  viscosity (in a 2.5 cup according to the DIN EN ISO 2433/ASTM D5125 standard): 49 sec,
  the content of volatile organic compounds is 11.38%,
  the presence of a large quantity of non-polar aprotic solvent (propylene glycol) promotes the drying of the primer under industrial conditions.

Comparative Example 8

Preparation of an Aqueous Phase Primer Composition P3 from the Intermediate SFC4 of Example 4

A bonding primer composition P3 comprising the following compounds, in the respective quantities indicated in g per 1001000 g of composition, is prepared:

| | |
|---|---|
| PTFE dispersion (60% dry extract) | 318 g |
| carbon black dispersion (25% dry extract) | 41 g |
| intermediate SFC4 (9.5% dry extract) | 434 g |
| ethoxylated alkylphenol-based non-ionic surfactant system (13%) | 21 g |
| colloidal silica (30% dry extract) | 62 g |
| NH4OH (d = 0.9) | 2 g |
| distilled water | 122 g |
| TOTAL | 1000 g |

The content of amine in the primer is comprised between 1 and 2%. The content of polar aprotic solvent in the composition is comprised between 16 and 18%. The content of organic solvent is less than 5%. The content of water in the primer formulation is comprised between 50% and 55%.

The content of PAI resin in the total composition is 4.13%.

The content of polar aprotic solvent (NEP) in the total composition is 0.54%.

The weight ratio between the quantity of polyamide-amic acid in the primer composition PC3 and the quantity of polar aprotic solvent (NEP) in the primer composition PC3 (PAI/PAS ratio) is 15.21%.

To prepare the primer composition PC3, all of the other compounds mentioned above are added to the aqueous intermediate SFC4.

The primer composition PC3 thus obtained has the following properties:
  measured dry extract of the primer: 26.5%,
  viscosity (in a 2.5 cup according to the DIN EN ISO 2433/ASTM D5125 standard): 50 sec,
  the content of volatile organic compounds is 16.9%.

Example 9

Preparation of an Aqueous Phase Primer Composition P4 from the Intermediate SF5 of Example 5

A bonding primer composition P4 comprising the following compounds, in the respective quantities indicated in g per 100 g of composition, is prepared:

| | |
|---|---|
| PTFE dispersion (60% dry extract) | 34.36 g |
| carbon black dispersion (25% dry extract) | 3.95 g |
| intermediate SF5 (6.3% dry extract) | 41.89 g |
| ethoxylated alkylphenol-based non-ionic surfactant system (13%) | 5.81 g |
| colloidal silica (30% dry extract) | 12.37 g |
| Distilled water | 1.62 g |
| TOTAL | 100 g |

The content of amine in the primer is less than 2%. The content of polar aprotic solvent in the primer composition is less than 0.3%. The content of organic solvent is less than 5%. The content of water in the primer formulation is comprised between 65% and 68%.

The content of PAI resin in the total composition is 2.48%.

The content of polar aprotic solvent (NMP) in the total composition is 0.35%.

The weight ratio between the quantity of polyamide-amic acid in the primer composition P4 and the quantity of polar aprotic solvent (NMP) in the primer composition P4 (PAI/PAS ratio) is 7.08.

To prepare the primer composition P4, all of the other compounds mentioned above are added to the aqueous intermediate SF5.

The primer composition P4 thus obtained has the following properties:
  measured dry extract of the primer: 29.1%,
  viscosity (in a 2.5 cup according to the DIN EN ISO 2433/ASTM D5125 standard): 49 sec,
  the content of volatile organic compounds is 2.58%.

Example 10

Preparation of an Aqueous Phase Primer Composition P5 from the Intermediate SF1 of Example 1

A bonding primer composition P5 comprising the following compounds, in the respective quantities indicated in g, is prepared:

| | |
|---|---|
| PTFE dispersion (60% dry extract) | 34.36 g |
| carbon black dispersion (25% dry extract) | 3.95 g |
| intermediate SF1 (6.9% dry extract) | 41.89 g |
| ethoxylated alkylphenol-based non-ionic surfactant system (13%) | 5.81 g |
| colloidal silica (30% dry extract) | 12.37 g |
| NMP | 1.52 g |
| distilled water | 1.62 g |
| TOTAL | 101.52 g |

The content of amine in the primer is less than 2%. The content of organic solvent is less than 5%. The content of water in the primer formulation is comprised between 64% and 68%.

The content of PAI resin in the total composition is 2.89%.

The content of polar aprotic solvent (NMP) in the total composition is 1.9%.

The weight ratio between the quantity of polyamide-amic acid in the primer composition P5 and the quantity of polar aprotic solvent (NMP) in the primer composition P5 (PAI/PAS ratio) is 1.52.

To prepare the primer composition P5, all of the other compounds mentioned above are added to the aqueous intermediate SF1.

The primer composition P5 thus obtained has the following properties:
  measured dry extract of the primer: 28.5%,
  viscosity (in a 2.5 cup according to the DIN EN ISO 2433/ASTM D5125 standard): 55 sec,
  the content of volatile organic compounds is 4.07%,
  the presence of a small quantity of polar aprotic solvent, which is less than the labeling limit, promotes the drying of the primer under industrial conditions.

Example 11

Preparation of an Aqueous Phase Primer Composition P6 from the Intermediate SF1 of Example 1

A bonding primer composition P6 comprising the following compounds, in the respective quantities indicated in g per 100 g of composition, is prepared:

| | |
|---|---|
| PTFE dispersion (60% dry extract) | 34.36 g |
| carbon black dispersion (25% dry extract) | 3.95 g |
| intermediate SF1 (6.9% dry extract) | 41.89 g |
| ethoxylated alkylphenol-based non-ionic surfactant system (13%) | 5.81 g |
| colloidal silica (30% dry extract) | 12.37 g |
| NMP | 1.01 g |
| distilled water | 1.62 g |
| TOTAL | 101.01 g |

The content of amine in the primer is less than 2%. The content of organic solvent is less than 5%. The content of water in the primer formulation is comprised between 64% and 68%.

The content of PAI resin in the total composition is 2.90%.

The content of polar aprotic solvent (NMP) in the total composition is 1.41%.

The weight ratio between the quantity of polyamide-amic acid in the primer composition P6 and the quantity of polar aprotic solvent (NMP) in the primer composition P6 (PAI/PAS ratio) is 2.06.

To prepare the primer composition P6, all of the other compounds mentioned above are added to the aqueous intermediate SF1.

The primer composition P6 thus obtained has the following properties:
  measured dry extract of the primer: 28.7%,
  viscosity (in a 2.5 cup according to the DIN EN ISO 2433/ASTM D5125 standard): 54 sec,
  the content of volatile organic compounds is 3.58%,
  the presence of a small quantity of polar aprotic solvent, which is less than the labeling limit, promotes the drying of the primer under industrial conditions.

Example 12

Preparation of an Aqueous Phase Primer Composition P7 from the Intermediate SF1 of Example 1

A bonding primer composition P7 comprising the following compounds, in the respective quantities indicated in g, is prepared:

| | |
|---|---|
| PTFE dispersion (60% dry extract) | 34.36 g |
| carbon black dispersion (25% dry extract) | 3.95 g |
| intermediate SF1 (6.9% dry extract) | 41.89 g |
| ethoxylated alkylphenol-based non-ionic surfactant system (13%) | 5.81 g |
| colloidal silica (30% dry extract) | 12.37 g |
| NMP | 0.55 g |
| distilled water | 1.62 g |
| TOTAL | 100.55 g |

The content of amine in the primer is less than 2%. The content of organic solvent is less than 5%. The content of water in the primer formulation is comprised between 64% and 68%.

The content of PAI resin in the total composition is 2.92%.

The content of polar aprotic solvent (NMP) in the total composition is 0.96%.

The weight ratio between the quantity of polyamide-amic acid in the primer composition P7 and the quantity of polar aprotic solvent (NMP) in the primer composition P7 (PAI/PAS ratio) is 3.04.

To prepare the primer composition P7, all of the other compounds mentioned above are added to the aqueous intermediate SF1.

The primer composition P7 thus obtained has the following properties:
  measured dry extract of the primer: 28.8%,
  viscosity (in a 2.5 cup according to the DIN EN ISO 2433/ASTM D5125 standard): 55 sec,
  the content of volatile organic compounds is 1.86%.

Example 13

Preparation of an Aqueous Phase Primer Composition P8 from the Intermediate SF1 of Example 1

A bonding primer composition P8 comprising the following compounds, in the respective quantities indicated in g, is prepared:

| | |
|---|---:|
| PTFE dispersion (60% dry extract) | 34.36 g |
| carbon black dispersion (25% dry extract) | 4.5 g |
| intermediate SF1 (6.9% dry extract) | 95.00 g |
| ethoxylated alkylphenol-based non-ionic surfactant system (13%) | 5.81 g |
| colloidal silica (30% dry extract) | 14.00 g |
| NMP | 0.55 g |
| TOTAL | 154.22 g |

The content of amine in the primer is less than 3%. The content of organic solvent is less than 5%. The content of water in the primer formulation is comprised between 68% and 75%.

The content of PAI resin in the total composition is 4.27%.

The content of polar aprotic solvent (NMP) in the total composition is 0.96%.

The weight ratio between the quantity of polyamide-amic acid in the primer composition P8 and the quantity of polar aprotic solvent (NMP) in the primer composition P8 (PAI/PAS ratio) is 4.45.

To prepare the primer composition P8, all of the other compounds mentioned above are added to the aqueous intermediate SF1.

The primer composition P8 thus obtained has the following properties:

measured dry extract of the primer: 21.6%, viscosity (in a 2.5 cup according to the DIN EN ISO 2433/ASTM D5125 standard): 60 sec, the content of volatile organic compounds is 3.56%.

Example 14

Manufacturing and Testing of Non-Stick Items

In standard fashion one of the sides of the aluminum substrates is coated with one of the primer compositions P1, P2, PC3, P4, and P5 to P8 to form a primer layer.

The finish composition F is then applied to the primer layers, and the whole is baked at a temperature of ca. 420° C. for a period comprised ranging from 5 to 20 minutes.

Substrates coated with a non-stick primer layer are obtained, which are then subjected to the battery of tests indicated above in the present application.

The values obtained from these different tests are summarized in result tables 1 and 2 below.

The results presented in tables 1 and 2 below show that the primers P1, P2, and P4 of the invention exhibit a very high safety level because their content of polar aprotic solvent is very low which permits their handling without taking special precautions.

The primers P5 and P6 exhibit a good safety level because they are exempt from special labeling and can be used when the industrial conditions require quick drying.

This is also the case for the primer P2, but at the expense of a content of organic compounds greatly reduced relative to PC3 but slightly higher than for the primers P1, P4 and P5 to P8.

The primers P7 and P8 have an intermediate behavior.

All of the primers also exhibit adhesion and corrosion resistance performances similar to or better than the standard (comparative) formulations rich in polar aprotic solvent.

In addition, the primers P1 and P2 exhibit excellent viscosity stability over time, making them easier to handle and store.

Furthermore, these results demonstrate the value of having viscosities as stable as possible over time, as this facilitates logistics operations by extending shelf-life.

TABLE 1

| Properties Test results | Example 6 PRIMER P1 | Example 7 PRIMER P2 | Comparative example 8 PRIMER PC3 | Example 9 PRIMER P4 |
|---|---|---|---|---|
| Intermediate type | SF1 | SF2 | SFC4 | SF5 |
| Amine type | 2-butylaminoethanol | isopropylaminoethanol (IPAE) | triethylamine | triethylamine |
| Amine content | <2% | <2% | <2% | <2% |
| Polar aprotic solvent content | <0.3% | <0.3% | 15%-18% | <0.3% |
| PAI/PAS ratio | 7.00 | 7.00 | 0.2 | 7.00 |
| Organic solvent content | <5% | 8%-10% | <5% | <5% |
| Viscosity stability of the primer at 40° C. | >60 days | >60 days | <10 days | >30 days <60 days |
| Adhesion test on smooth aluminum substrate | OK | OK | OK | OK |
| Resistance to corrosion on smooth aluminum substrate | OK 100% compliant | OK 100% compliant | Poor 100% of corrosion points | 75% of corrosion points |
| Resistance to abrasion on snadblasted aluminum substrate | Appearance of scratches on the metal: 11,000 rubs Total loss of non-sticking: 20,000 rubs | Appearance of scratches on the metal: 10,000 rubs Total loss of non-sticking: 20,000 rubs | Appearance of scratches on the metal: 7,000 rubs Total loss of non-sticking: 16,000 rubs | Appearance of scratches on the metal: 8,000 rubs Total loss of non-sticking: 17,000 rubs |

TABLE 2

| Properties Test results | Example 10 PRIMER P5 | Example 11 PRIMER P6 | Example 12 PRIMER P7 | Example 13 PRIMER P8 |
|---|---|---|---|---|
| Intermediate type | SF1 | SF1 | SF1 | SF1 |
| Amine type | 2-butylaminoethanol | 2-butylaminoethanol | 2-butylaminoethanol | 2-butylaminoethanol |
| Amine content | <2% | <2% | <2% | <3% |
| Polar aprotic solvent content | 1.9% | 1.41% | 0.96% | 0.96 |
| PAI/PAS ratio | 1.52 | 2.06 | 3.04 | 4.45 |
| Organic solvent content | <5% | <5% | <5% | <5% |

TABLE 2-continued

| Properties Test results | Example 10 PRIMER P5 | Example 11 PRIMER P6 | Example 12 PRIMER P7 | Example 13 PRIMER P8 |
|---|---|---|---|---|
| Viscosity stability of the primer at 40° C. | >60 days | >60 days | >60 days | >60 days |
| Adhesion test on smooth aluminum substrate | OK | OK | OK | OK |
| Resistance to corrosion on smooth aluminum substrate | OK 100 % compliant | OK 100 % compliant | OK 100 % compliant | OK 100 % compliant |
| Resistance to abrasion on snadblasted aluminum substrate | Appearance of scratches on the metal: 11,000 rubs Total loss of non-sticking: 20,000 rubs | Appearance of scratches on the metal: 12,000 rubs Total loss of non-sticking: 20,000 rubs | Appearance of scratches on the metal: 13,000 rubs Total loss of non-sticking: 20,000 rubs | No appearance of scratches Total loss of non-sticking: 20,000 rubs |

The invention claimed is:

1. Primer composition for a non-stick coating, comprising at least a fluorocarbon resin, a polyamide-amic acid having an acid value of 50 to 200 mg of KOH/g, a Lewis base, water, and less than 5 wt % of a polar aprotic solvent relative to the total weight of said composition,
wherein the weight ratio between the quantity of polyamide-amic acid in said composition and the quantity of polar aprotic solvent in said composition is at least 1.5, and
wherein the Lewis base is chosen from 2-butyl-aminoethanol, isopropylaminoethanol, and amino-2-ethyl-1,3-propanediol.

2. Composition according to claim 1, wherein the weight ratio between the quantity of polyamide-amic acid in said composition and the quantity of polar aprotic solvent in said composition is comprised between 5 and 9.

3. Composition according to claim 1, comprising less than 1 wt % of a polar aprotic solvent relative to the total weight of the composition.

4. Composition according to claim 1, comprising less than 45 wt %, of a non-polar aprotic organic solvent relative to the total weight of the composition.

5. Composition according to claim 1, wherein the polyamide-amic acid comprises amide-amic acid units of the structural formula [1] in which R represents a divalent arylene radical:

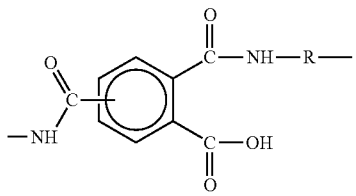

[1]

and amide-imide units of the structural formula [2]:

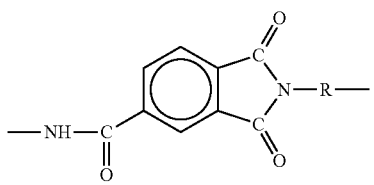

[2]

the molar ratio of said amide-amic acid units to said amide-imide units being 18:1 to 5:1.

6. Composition according to claim 1, wherein the fluorocarbon resin is chosen from the group comprising polytetrafluoroethylenes (PTFE), tetrafluoroethylene-perfluoropropylvinylether copolymers (PFA), tetrafluoroethylene-hexafluoropropene copolymers (FEP), polyvinylidene fluorides (PVDF), MVA (TFE/PMVE copolymer), TFE/PMVE/FAVE terpolymers, ETFE, and mixtures thereof.

7. Composition according to claim 6, wherein the fluorocarbon resin is polytetrafluoroethylene (PTFE), or a mixture (PTFE/PFA) of polytetrafluoroethylene (PTFE) and tetrafluoroethylene-perfluoropropylvinylether copolymer (PFA), or a mixture (PTFE/FEP) of polytetrafluoroethylene (PTFE) and tetrafluoroethylene-hexafluoropropene copolymer (FEP).

8. Composition according to claim 1, wherein the fluorocarbon resin represents 20 wt % to 98 wt % of the total dry weight of the primer composition.

9. Composition according to claim 8, wherein the fluorocarbon resin represents 50 wt % to 80 wt % of the total dry weight of the primer composition.

10. Composition according to claim 1, further comprising at least one filler.

11. Composition according to claim 10, wherein the filler represents less than 40 wt %, of the total weight of the primer composition.

12. Composition according to claim 10, wherein the filler is in the form of silica or alumina nanoparticles.

13. Method for preparing a primer composition for a non-stick coating, comprising the following steps: preparation of an aqueous mixture containing:
a polyamide-amic acid having an acid value comprised between 50 and 200 mg of KOH/g,
a Lewis base, present in said aqueous mixture in a quantity representing 95% to 250% of the stoichiometric quantity needed to neutralize the acid groups of said polyamide-amic acid,
water, and
less than 5 wt % of polar aprotic solvent relative to the total weight of said composition; and
emulsification of said aqueous mixture by heating at atmospheric pressure and at a temperature of at least 40° C., then mixing of said emulsion with a fluorocarbon resin in the form of a powder or in aqueous dispersion;
wherein the polyamide-amic acid is present in a quantity such that the weight ratio between the quantity of polyamide-amic acid in said composition and the quantity of polar aprotic solvent in said composition is at least 1.5, and wherein the Lewis base is chosen from 2-butyl-aminoethanol, isopropylaminoethanol, and amino-2-ethyl-1,3-propanediol.

14. Method according to claim 13, wherein the weight ratio between the quantity of polyamide-amic acid in said composition and the quantity of polar aprotic solvent in said composition is comprised between 5 and 9.

15. Method according to claim 13 wherein said emulsion comprises less than 1 wt % of the polar aprotic solvent relative to the total weight of the composition.

16. Method according to claim 13, wherein the emulsification is carried out at a temperature comprised between 50 and 85° C.

17. Method according to claim 13, wherein the dispersing medium of said emulsion is water and the dispersed phase is in the form of droplets with a mean diameter equal to or less than 5 µm.

18. Method according to claim 17, wherein the mean diameter of the droplets is comprised between 20 and 500 nm.

19. Method according to claim 18, wherein the mean diameter of said droplets is equal to or less than 300 nm.

20. Method according to claim 13, wherein said emulsion comprises less than 45 wt % of a non-polar aprotic organic solvent relative to the total weight of the composition.

21. Method for manufacturing an item, comprising the following steps:
provision of a metal substrate having two opposite sides;
application of a least one layer of primer composition, as defined in claim 1, on one of the sides of said substrate;
application of at least one layer of finish composition comprising at least a fluorocarbon resin on said layer of primer composition; then
baking of the whole at a temperature between 370° C. and 430° C.

22. Item obtainable by the method as defined in claim 21.

23. Item according to claim 22 constituting a cookware item, one of the sides of which constitutes an inner side intended to contact food placed inside said item and the other side of which is a convex outer side intended to contact a heat source.

24. Composition according to claim 1, comprising less than 0.3 wt % of a polar aprotic solvent relative to the total weight of the composition.

* * * * *